Oct. 13, 1953 E. W. JOHNSTON 2,654,951
PROFILE TRACING MACHINE
Filed Oct. 12, 1949 4 Sheets-Sheet 1
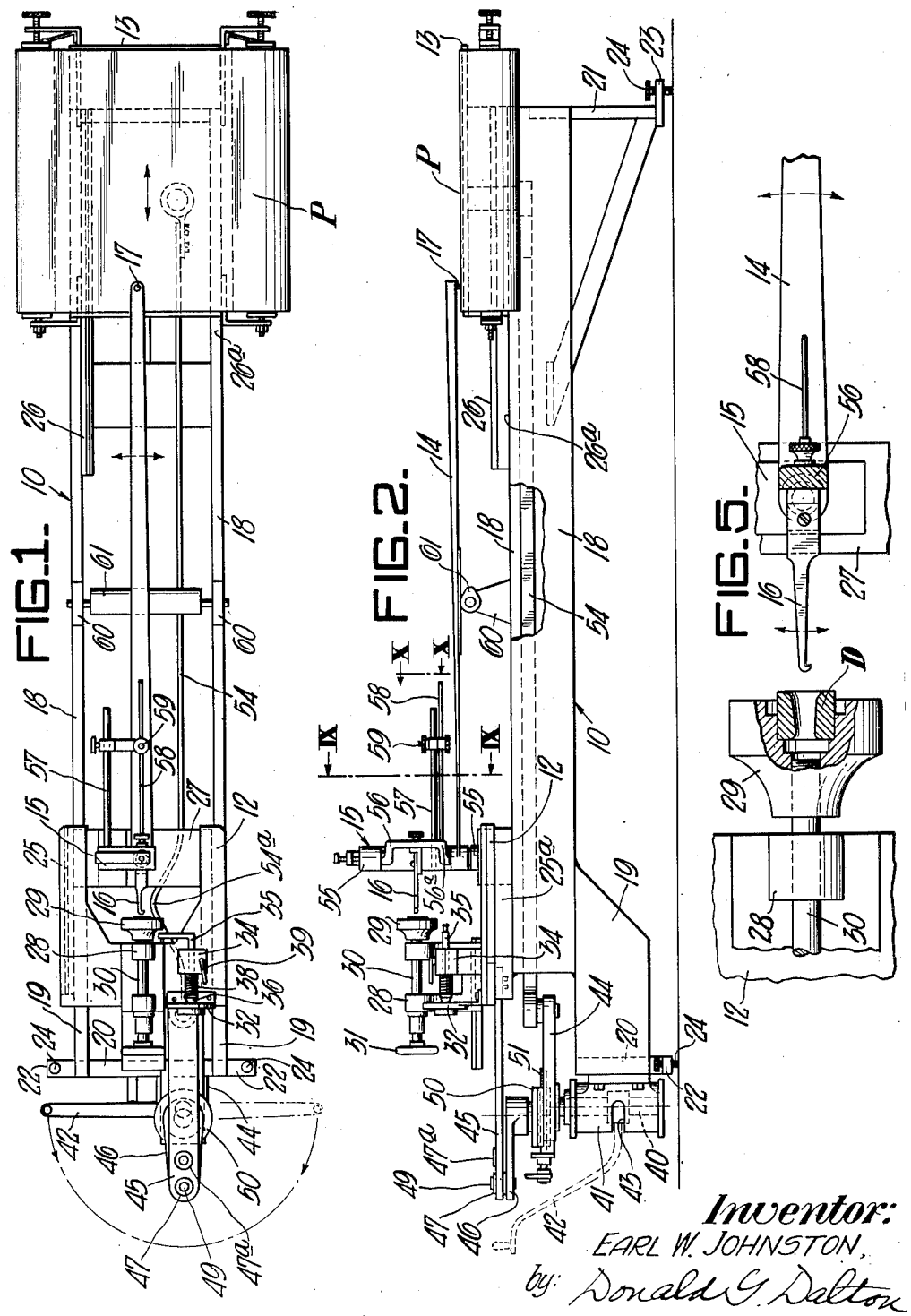
Inventor:
EARL W. JOHNSTON,
by Donald G. Dalton
his Attorney

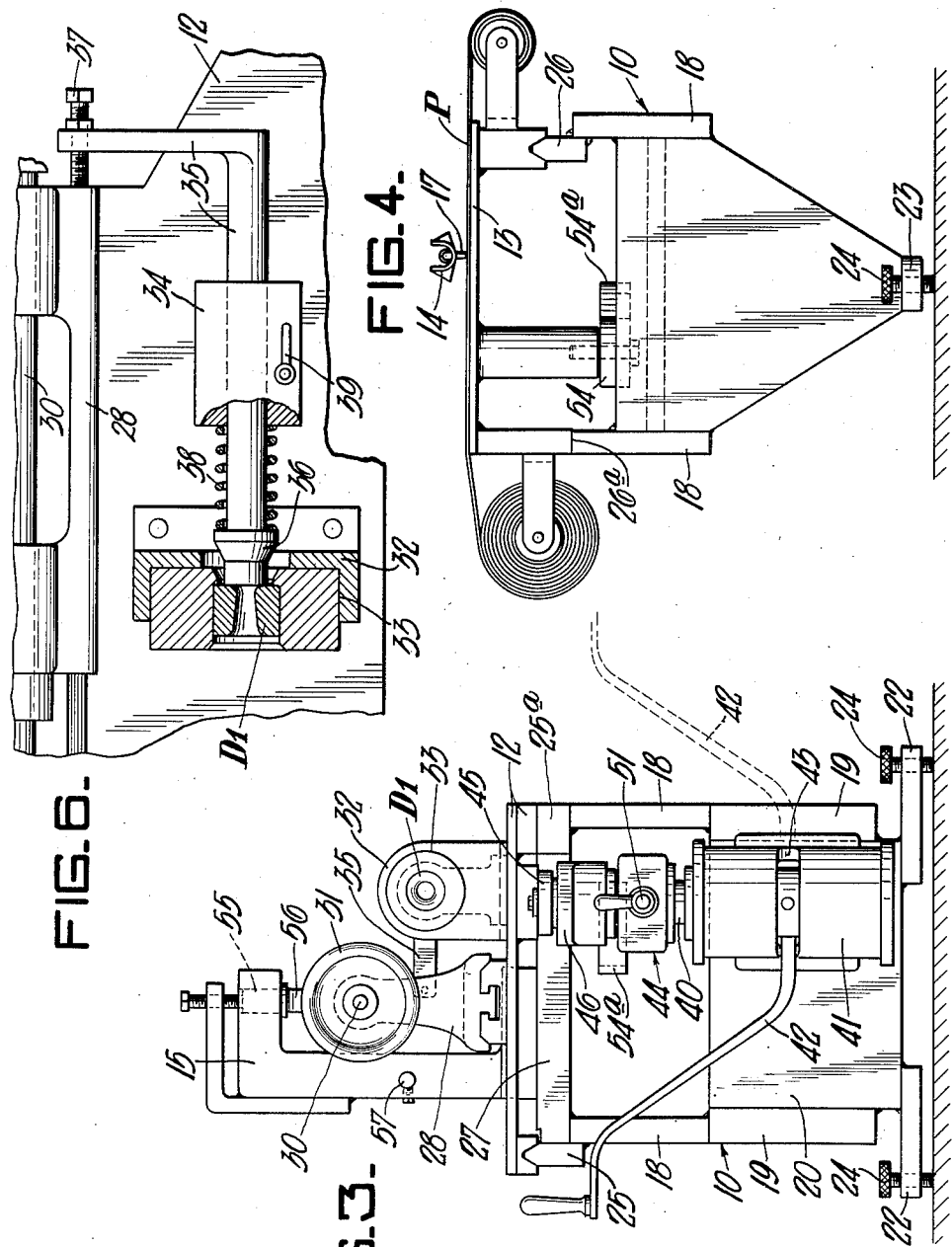

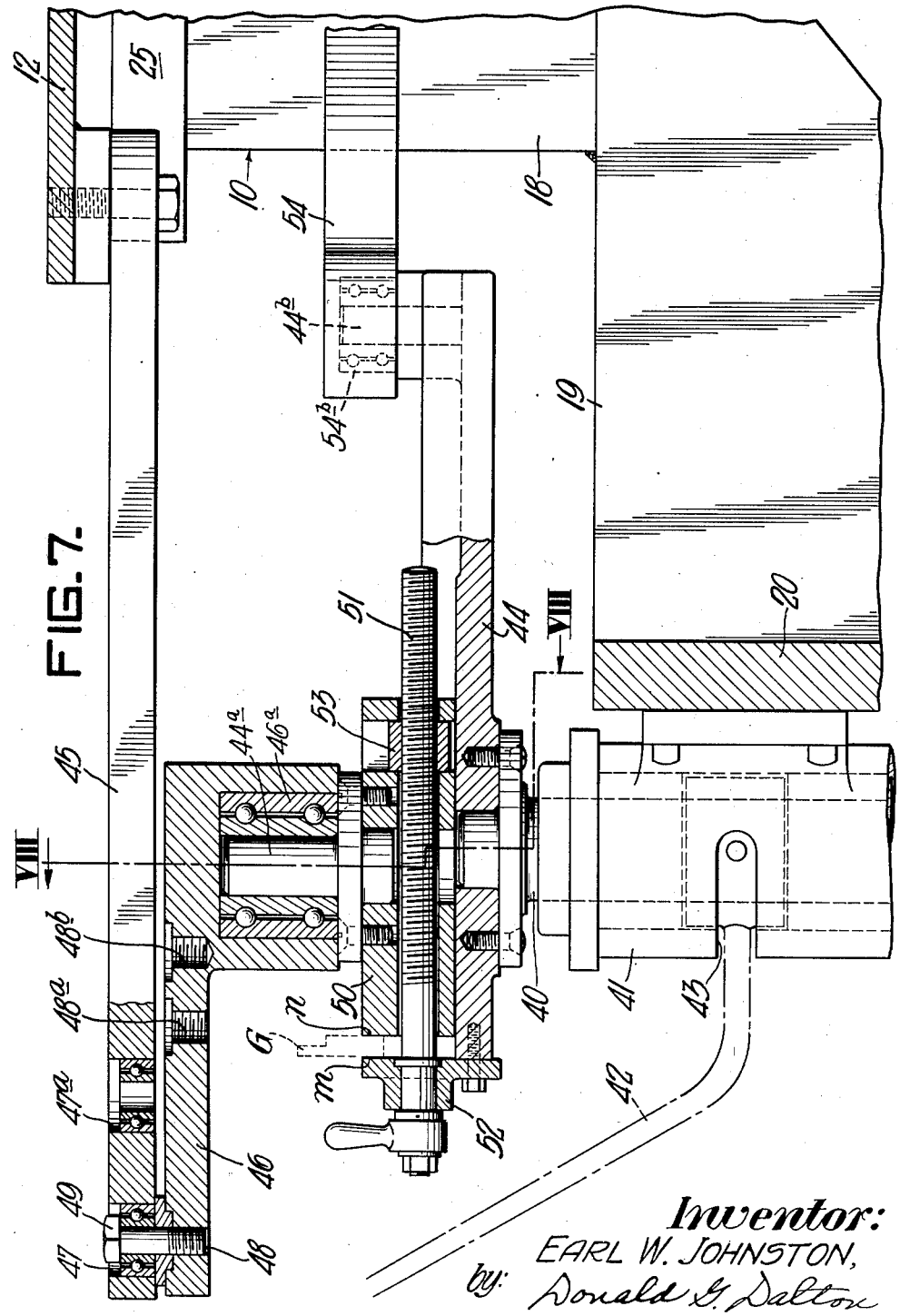

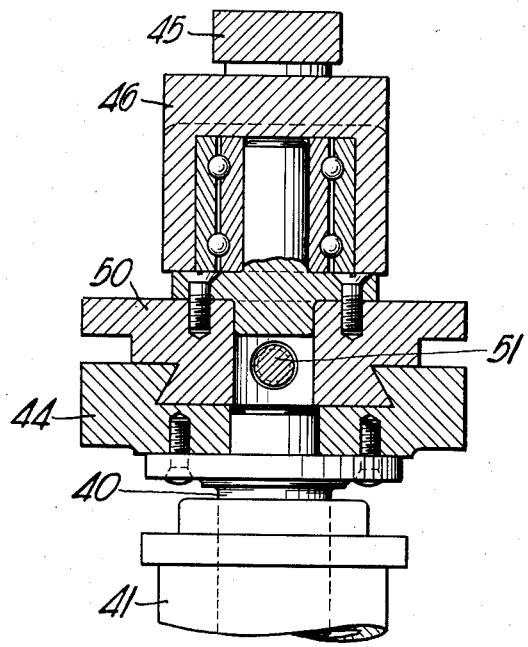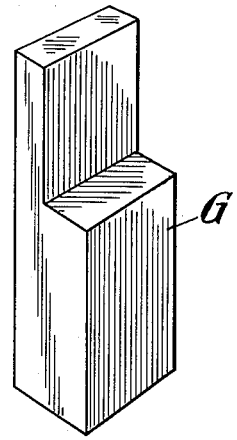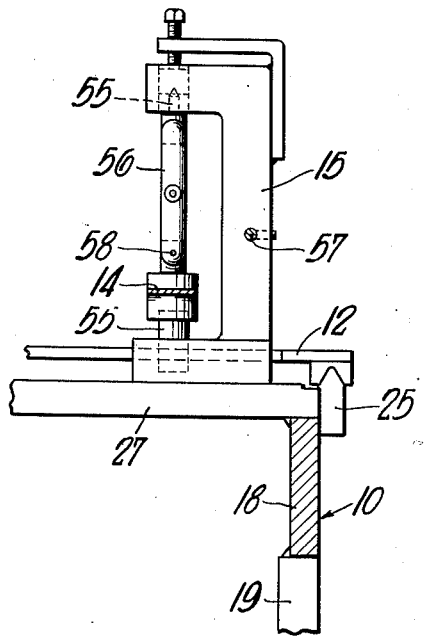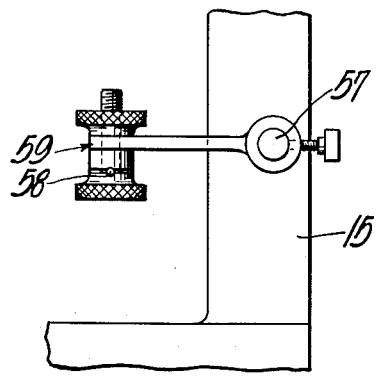
Inventor:
EARL W. JOHNSTON,
by Donald G. Dalton
his Attorney.

Patented Oct. 13, 1953

2,654,951

UNITED STATES PATENT OFFICE 2,654,951

PROFILE TRACING MACHINE

Earl W. Johnston, Worcester, Mass., assignor to United States Steel Corporation, a corporation of New Jersey Application October 12, 1949, Serial No. 120,999

5 Claims. (Cl. 33—23)

1

This invention relates to machines for tracing profiles especially of wire drawing dies, although obviously similar machines can be used for tracing profiles of other articles.

Wire drawing dies have nibs of hard material which contain a central passage through which wire is pulled to effect a size reduction. The size and shape of this passage should conform to certain known standards. Satisfactory instruments already are available for measuring the diameter and the roundness of this passage. The present invention affords a means for tracing on an enlarged scale the longitudinal profile of such passages and thereby facilitates measuring their interior angles and longitudinal dimensions.

An object of the invention is to provide improved machines for tracing enlarged profiles in which the scale automatically is enlarged both transversely and longitudinally by the same multiple.

A further object of the invention is to provide improved machines for tracing profiles of wire drawing die passages in which the profile is traced on an enlarged scale that enables ready measurement of the various interior angles and longitudinal dimensions of such passages.

In accomplishing these and other objects of the invention, I have provided improved details of structure, a preferred form of which is shown in the accompanying drawings, in which:

Figure 1 is a top plan view of an improved profile tracing machine which embodies features of the present invention;

Figure 2 is a side elevational view of the machine;

Figures 3 and 4 are end elevational views from the left and right respectively;

Figure 5 is an enlarged top plan view, partly in section of the die, die holder and tracing point;

Figure 6 is an enlarged top plan view, partly in section of the positioning means for the die holder;

Figure 7 is an enlarged side elevational view partly in section of the linkage which moves the slide and the platen;

Figure 8 is a vertical sectional view taken substantially on line VIII—VIII of Figure 7;

Figures 9 and 10 are vertical sectional views taken substantially on lines IX—IX and X—X of Figure 2; and Figure 11 is a perspective view of a gauge block which can be used conveniently in conjunction with the machine.

The machine comprises a base 10 which supports a die mounting slide 12 and a platen 13.

2

The die mounting slide is situated adjacent the left end of the base and the platen adjacent the right end, as viewed in Figures 1 and 2. The die mounting slide has mechanism hereinafter described for mounting a die D while the machine traces the profile of its passage. In the example of a wire drawing die, the die D normally would include the usual outer steel casing and central nib of harder material fixed in said casing, but for simplicity Figure 5 shows this die schematically as a single piece. Figure 6 hereinafter described shows such a die as actually constructed. A linkage hereinafter described has a pivotal connection to the base and is connected to the slide and the platen. This linkage furnishes a means for moving both the slide and platen simultaneously in opposite directions with the platen moving proportionately to the slide, but through a much greater distance. The ratio of travel between the platen and the slide determines the enlargement of the tracing in the longitudinal direction.

A tracing lever 14 is pivoted on the base between the platen and the slide on an upright post 15 and turns on an approximately vertical fixed axis. Said lever has a short lever arm to the left of its pivot and a much longer lever arm to the right. The ratio of the lengths of these arms is the same as the ratio of travel between the slide and the platen, and this ratio determines the scale of enlargement of the tracing in the transverse direction. The short lever arm carries a tracing point 16 which follows the profile of die D as the latter moves longitudinally. The long lever arm carries a marking device 17 which traces this profile on a roll of paper P which the platen carries. The details of the mounting means for these parts are described more fully hereinafter.

Base 10 includes longitudinal side members 18 which are offset downwardly at the end of the machine adjacent the slide, as indicated at 19 (Figure 2). End cross members 20 and 21 connect said side members, preferably being welded thereto to furnish a rigid structure. End member 20, which is adjacent the offset, carries two outwardly extending legs 22 and end member 21, which is adjacent the other end, carries a single centrally located leg 23. Each of these three legs carries an adjusting screw 24 for leveling the machine or canting it slightly, as hereinafter explained. The upper edges of side members 18 carry guides 25 and 25a for the slide, guides 26 and 26a for the platen, and a transverse piece 27 which mounts pivot 15 for the tracing lever 14. The slide preferably is a plate which is U- shaped in plan (Figure 1). The pivotal mounting 15 of tracing lever 14 is situated between the arms of the U. The slide plate carries an upright bearing stand 28 which supports a die holder 29. Preferably this holder is of the draw type, having a three-point chuck for holding dies D. A spindle 30 and a hand wheel 31 operate said die holder to clamp and release dies. Since the die holder per se can be of any known construction, no detailed description is deemed necessary.

Stand 28 can be adjusted longitudinally of the slide to set the machine to different sizes and types of dies and the slide carries means for determining the proper position of stand 28 for any particular die. With reference to Figure 6, said means includes an upstanding plate 32 which has a depression 33 in the face opposite die holder 29 for receiving the casing of a die D—1 for which the machine is to be set. A bearing 34 on the slide carries a slidable L-shaped gauging rod 35. One arm of rod 35 carries a gauge point 36 which is adapted to contact the nib of die D—1 and the other arm carries a set screw 37 which forms a stop adapted to abut stand 28. A spring 38 surrounds rod 35 and tends to force it to the left as viewed in Figure 6. To set the machine for die D—1, this die is held manually in depression 33. Gauge point 36 contacts the die nib and forces rod 35 to the right against the action of spring 38. Bearing 34 is equipped with a clamp screw 39 for fixing rod 35 in adjusted position.

After said rod has been moved to its adjusted position, said set screw is turned to clamp the rod in this position. Next die D—1 is transferred to the die holder 29 and clamped therein. Finally stand 28 is adjusted until it abuts the end of set screw 37, at which position it is properly set for tracing a profile of the passage in die D—1.

Figures 1, 2 and 7 show the starting position of the operating linkage for the slide and platen. With particular reference to Figure 7, this linkage includes a main shaft 40 which is journaled for rotation on an approximately vertical axis within a bearing 41 fixed to the end cross member 20 of the base. A handle 42 is fixed to the midportion of said shaft and rides in an approximately 180° slot 43 in the side wall of said bearing. A crank arm 44 is fixed to the upper end of shaft 40 and projects both to the left and to the right therefrom. Referring back to Figure 1, it is seen that in the starting position handle 42 is in its extreme clockwise position and crank arm 44 extends parallel to the direction of travel of the slide and platen.

Slide 12 has a tongue portion 45 fixed to its left end. A relatively short connecting rod 46 is pivotally connected both to the crank arm 44 and to said tongue. The pivotal connection of this connecting rod to the crank arm 44 includes a crank pin 44a which is non-rotatably mounted on said crank arm and in the starting position of the linkage is to the left of shaft 40. The eccentricity of crank pin 44a with respect to shaft 40 is relatively small and is adjustable. The adjustable mounting includes a tool slide 50 which is slidable along the upper face of crank arm 44 and to which pin 44a is fixed. A spindle 51 is journaled in a bearing 52 in the left end of crank arm 44 and is threadedly engaged with a nut 53 carried on the tool slide 50. Thus rotation of shaft 40 through 180° moves crank pin 44a through a 180° arc, the radius of which is relatively small and is adjustable by rotation of spindle 51 and consequent adjustment of tool slide 50. Crank pin 44a is rotatably received in a bearing 46a in the end of the connecting rod 46. The pivotal connection of this connecting rod to tongue 45 includes a pivot pin 49, which passes through either of two bearings 47 or 47a in said tongue and is fixed in either of three tapped openings 48, 48a or 48b in said connecting rod. Movement of crank pin 44a through its 180° arc pushes slide 12 to the right. As hereinafter fully explained, the positions of the crank pin 44a and of the pivot pin 49 determine the distance which the slide travels on rotation of shaft 40, and consequently determine the enlargement ratio of the tracing on the platen in the longitudinal direction.

A relatively long connecting rod 54 is pivotally connected both to the crank arm 44 and to platen 13. The pivotal connection of this connecting rod to the crank arm includes a crank pin 44b which is fixed to said crank arm and in the starting position of the linkage is to the right of shaft 40. The eccentricity of crank pin 44b is much greater than that of crank pin 44a. Thus rotation of shaft 40 through 180° also moves crank pin 44b through a 180° arc, the radius of which is much greater than that of the 180° arc through which crank pin 44a moves. Crank pin 44b is rotatably received in a bearing 54b in the end of the connecting rod 54. This connecting rod is curved at 54a so that it can clear the tool slide 50 and connecting rod 46 when shaft 40 is rotated 180° from its starting position. Movement of crank pin 44b through its 180° arc thus pulls platen 13 to the left.

In the construction illustrated the machine can be adjusted for enlargement ratios of 10, 25 or 50 to 1, although it is obvious other ratios can be obtained by proper selection of connecting rod and crank arm lengths. The length of the connecting rod 54 and the eccentricity of the crank pin 44b are fixed so that the platen always moves a fixed distance on rotation of shaft 40. The different enlargement ratios are obtained by adjusting the effective length of the connecting rod 46 and the eccentricity of the crank pin 44a and thus adjusting the distance which the slide moves. For an enlargement ratio of 10 to 1, the effective length of the connecting rod 46 must be adjusted to one tenth the fixed length of the connecting rod 54 and at the same time the eccentricity of crank pin 44a must be adjusted to one tenth the fixed eccentricity of crank pin 44b. Similarly for enlargement ratios of 25 or 50 to 1 the effective length of the connecting rod 46 must be adjusted to one twenty-fifth or one-fiftieth the length of the connecting rod 54 and the eccentricity of the crank pin 44a must be adjusted to one twenty-fifth or one-fiftieth the eccentricity of crank pin 44b.

When pivot pin 49 is fixed in opening 48 of the connecting rod 46, this connecting rod has an effective length one-tenth that of the connecting rod 54. When this pivot pin is fixed in opening 48a or 48b, the connecting rod 46 has an effective length one twenty-fifth or one-fiftieth that of the connecting rod 54. The bearing 47 in tongue 45 is used when the pivot pin is fixed in the opening 48 or 48a and the bearing 47a when this pin is fixed in the opening 48b to bring the slide to the proper position with respect to the tracing point 16. In either event the eccentricity of the crank pin 44a, not that of the tongue, determines the distance of travel of the slide. Preferably the bearing 52 and the tool slide 50 have flat faces m and n directed toward each other. A gauge block G (Figure 11) can be inserted between these faces for determining the position of adjustment of the tool slide 50 to furnish any desired eccentricity of the crank pin 44a.

With reference to Figures 2, 5, 9 and 10, post 15, which mounts tracing lever 14, is preferably of C-shape in end elevation and has vertically adjustable anti-friction bearings 55. Said bearings support a spindle 56 which has a central offset 56a (Figure 2) and carries tracing point 16 hereinbefore referred to. This tracing point is removable and replaceable for adjusting the transverse enlargement ratio. The shorter the tracing point, the greater the enlargement. Spindle 56 also carries the long arm of the tracing lever which extends back to the tracing slide and carries marking device 17, also hereinbefore referred to. For maintaining the tracing point in contact with the die passage, post 15 carries a fixed rod 57 and spindle 56 carries a spring wire 58 fixed to its offset 56a. A clamp 59 joins said rod and said wire. Wire 58 tends to remain straight and thus holds the tracing point against the surface of the die passage, but can flex as the tracing point moves in accordance with the contour of this passage. Optionally these last named parts can be omitted and the base can be canted slightly, thus maintaining the tracing point in contact with the die passage by gravity.

Preferably side members 18 of the base carry upstanding bearings 60 about midway of their length (Figures 1 and 2). These bearings rotatably support a cam 61 on which the long arm of tracing lever 14 rests.

In operation, stand 28 is set properly for the particular die, which is then clamped therein. In this position tracing point 16 contacts the die passage adjacent its outer end. Handle 42 is rotated counterclockwise as viewed in Figure 1 through approximately 180° from its starting position to the position shown in dot-dash lines. Such rotation moves slide 12 to the right through a distance which varies according to the ratio for which the machine is adjusted. During such movement of the slide tracing point 16 traverses the die passage. The transverse movement of the tracing point on the die surface moves marking device 17 proportionately, but by a much greater amount. At the same time the linkage moves platen 13 to the left but by a similar greater amount than the slide. Thus the marking device traces the profile of the die on the paper, but on a much larger scale which is the same both longitudinally and transversely. Since the locations of the pivotal connections of link 54 are fixed, the distance which the platen moves is always the same.

From the foregoing description it is seen that the present invention provides a relatively simple and practical device for tracing longitudinal profiles of die openings. The machine accurately traces these profiles on an enlarged scale so that they can be easily measured.

The mechanism shown and described for positioning the die holder is not claimed in the present application, since it is claimed in a divisional application Serial No. 317,935, filed October 31, 1952.

While I have shown and described only a single embodiment of the invention, it is apparent that modifications may arise. Therefore, I do not wish to be limited to the disclosure set forth but only by the scope of the appended claims.

I claim:

1. A machine for tracing profiles comprising a base, an article mounting slide supported on said base adjacent one end thereof, a platen slidably supported on said base adjacent the other end thereof, a shaft journaled to said base, a crank arm fixed to said shaft, a first connecting rod pivotally connected to said crank arm and said slide, a second connecting rod pivotally connected to said crank arm and said platen, the pivotal connection of said second connecting rod to said crank arm having appreciably greater eccentricity with respect to said shaft than the pivotal connection of said first connecting rod to said crank arm has with respect to the shaft, manual means for rotating said shaft, rotation of said shaft moving both said slide and said platen simultaneously but moving said platen through an appreciably greater distance than said slide, and a tracing lever pivoted to said base between said slide and said platen on a fixed axis which closely approaches the vertical and having on one side of said axis a short lever arm which carries a tracing point adapted to traverse the profile of an article on said slide and on the opposite side of said axis a long lever arm adapted to trace an enlarged profile of the article on said platen.

2. A machine for tracing enlarged profiles of die passages comprising a base, a slide adapted to support a die slidably mounted on said base adjacent one end thereof, a platen adapted to have a profile traced thereon slidably mounted on said base adjacent the other end thereof, a linkage pivotally connected to said base and to said slide and platen and adapted to move said slide and platen simultaneously but said platen farther by a ratio equivalent to the enlargement ratio of the traced profile, a spindle pivotally mounted on said base between said slide and said platen and adapted to turn on an axis which closely approaches the vertical and having a portion offset toward said platen from its pivotal axis, a tracing point carried by the offset portion of said spindle and extending toward said slide and adapted to contact the passage of a die supported thereon, an arm carried by said spindle extending in the direction opposite said tracing point and toward said platen, the distance between said axis and the extremity of said arm being greater than the distance between said axis and the extremity of said tracing point and the ratio of these two distances being equal to the enlargement ratio of the traced profile, and means on the extremity of said arm adapted to trace a profile on said platen.

3. A machine as defined in claim 2 in which said linkage includes a shaft mounted on said base for rotation on a substantially vertical axis, a crank arm carried by said shaft for rotation therewith, a first connecting rod pivotally connected to said crank arm and said slide, and a second connecting rod pivotally connected to said crank arm and said platen, the pivotal connections of both of said connecting rods to said crank arm being eccentric with respect to said shaft, but the distance between the pivotal connection of said second connecting rod and the axis of said shaft being appreciably greater than the distance between the pivotal connection of said first connecting rod and the axis of said shaft, the two last named distances being in a ratio equivalent to the enlargement ratio of the traced profile.

4. A machine for tracing profiles comprising a base, an article mounting slide supported on said base adjacent one end thereof, a platen slidably supported on said base adjacent the other end for movement along a path which extends in the same directions as the path of movement of said slide, an upright shaft journaled to said base, a handle and a crank arm fixed to said shaft, a first connecting rod pivotally connected to said crank arm and said slide, a second connecting rod pivotally connected to said crank arm and said platen, the pivotal connections of both of said connecting rods to said crank arm being eccentric with respect to said shaft, but the distance between the pivotal connection of said second connecting rod and the axis of said shaft being appreciably greater than the distance between the pivotal connection of said first connecting rod and the axis of said shaft, rotation of said shaft thus moving both said slide and said platen simultaneously but moving said platen through an appreciably greater distance than said slide, and a tracing lever pivoted to said base between said slide and said platen on a fixed axis which closely approaches the vertical and having on the side of its axis toward said slide a short lever arm which carries a tracing point adapted to traverse the profile of an article on said slide and having on the opposite side of its axis toward said platen a long lever arm adapted to trace an enlarged profile of the article on said platen, the ratio of said lever arms being equivalent to the ratio of travel between said slide and said platen on rotation of said shaft.

5. A machine as defined in claim 4 in which the pivotal connections of said first connecting rod to said crank arm and to said slide are adjustable to vary the ratio of travel between said slide and said platen, and said short lever arm is removable and replaceable to effect similar adjustments in the ratio of said lever arms.

EARL W. JOHNSTON.

References Cited in the file of this patent

UNITED STATES PATENTS

| Number | Name | Date |
|---|---|---|
| 1,313,543 | Keller | Aug. 19, 1919 |
| 1,589,933 | Bontempi | June 22, 1926 |
| 1,649,966 | Mariotti | Nov. 22, 1927 |
| 1,669,905 | Keller | May 15, 1928 |
| 1,893,793 | Bortner | Jan. 10, 1933 |
| 2,329,382 | Blazek et al. | Sept. 14, 1943 |
| 2,341,284 | Payne | Feb. 8, 1944 |
| 2,414,377 | Judge | Jan. 14, 1947 |
| 2,466,685 | Cole | Apr. 12, 1949 |
| 2,488,088 | Marchant | Nov. 15, 1949 |

FOREIGN PATENTS

| Number | Country | Date |
|---|---|---|
| 865,954 | France | Mar. 24, 1941 |